(12) United States Patent  
Aronov

(10) Patent No.: US 10,862,104 B2  
(45) Date of Patent: Dec. 8, 2020

(54) MONO-CELL BATTERIES

(71) Applicant: StoreDot Ltd., Herzeliya (IL)

(72) Inventor: Daniel Aronov, Netanya (IL)

(73) Assignee: Storedot Ltd., Herzeliya (IL)

( * ) Notice: Subject to any disclaimer, the term of this patent is extended or adjusted under 35 U.S.C. 154(b) by 0 days.

(21) Appl. No.: 16/258,733

(22) Filed: Jan. 28, 2019

(65) Prior Publication Data

US 2020/0243842 A1    Jul. 30, 2020

(51) Int. Cl.
| | |
|---|---|
| H01M 4/134 | (2010.01) |
| H01M 4/1395 | (2010.01) |
| H01M 10/0525 | (2010.01) |
| H01M 4/02 | (2006.01) |
| H01M 4/38 | (2006.01) |

(52) U.S. Cl.
CPC ......... *H01M 4/134* (2013.01); *H01M 4/1395* (2013.01); *H01M 10/0525* (2013.01); *H01M 4/386* (2013.01); *H01M 4/387* (2013.01); *H01M 2004/021* (2013.01)

(58) Field of Classification Search
None
See application file for complete search history.

(56) References Cited

U.S. PATENT DOCUMENTS

| 5,393,617 A | 2/1995 | Klein |
| 9,472,804 B2 | 10/2016 | Burshtain et al. |
| 10,096,859 B2 | 10/2018 | Burshtain et al. |
| 10,199,677 B2 | 2/2019 | Drach et al. |
| 2009/0035664 A1 | 2/2009 | Chiang et al. |
| 2009/0117466 A1 | 5/2009 | Zhamu et al. |
| 2009/0291368 A1 | 11/2009 | Newman et al. |
| 2011/0143202 A1* | 6/2011 | Farmer ............... H01M 4/0416 429/218.1 |

(Continued)

FOREIGN PATENT DOCUMENTS

WO    WO 2018/109774 A1    6/2018

OTHER PUBLICATIONS

Definition of "particle", www.bing.com (Mar. 29, 2019) (Year: 2019).*

(Continued)

*Primary Examiner* — Carmen V Lyles-Irving
(74) *Attorney, Agent, or Firm* — Reches Patent

(57) ABSTRACT

Electrodes, production methods and mono-cell batteries are provided, which comprise active material particles embedded in electrically conductive metallic porous structure, dry-etched anode structures and battery structures with thick anodes and cathodes that have spatially uniform resistance. The metallic porous structure provides electric conductivity, a large volume that supports good ionic conductivity, that in turn reduces directional elongation of the particles during operation, and may enable reduction or removal of binders, conductive additives and/or current collectors to yield electrodes with higher structural stability, lower resistance, possibly higher energy density and longer cycling lifetime. Dry etching treatments may be used to reduce oxidized surfaces of the active material particles, thereby simplifying production methods and enhancing porosity and ionic conductivity of the electrodes. Electrodes may be made thick and used to form mono-cell batteries which are simple to produce and yield high performance.

10 Claims, 12 Drawing Sheets

(56) References Cited

U.S. PATENT DOCUMENTS

| | | |
|---|---|---|
| 2012/0121983 A1 | 5/2012 | Yoon et al. |
| 2013/0164612 A1 | 6/2013 | Tanemura et al. |
| 2013/0319870 A1 | 12/2013 | Chen et al. |
| 2016/0285081 A1 | 9/2016 | Matsuno et al. |
| 2017/0274687 A1 | 9/2017 | Takahashi |
| 2018/0138498 A1* | 5/2018 | Zhamu ............... H01M 4/0445 |
| 2018/0212236 A1 | 7/2018 | Jacob et al. |
| 2019/0027788 A1* | 1/2019 | Liu .................. H01M 10/0587 |
| 2019/0097264 A1* | 3/2019 | Joo .................. H01M 10/0525 |

OTHER PUBLICATIONS

Office Action issued for U.S. Appl. No. 16/254,632 dated Apr. 12, 2019.

Notice of Allowance of U.S. Appl. No. 16/258,730, dated Jun. 21, 2019.

\* cited by examiner

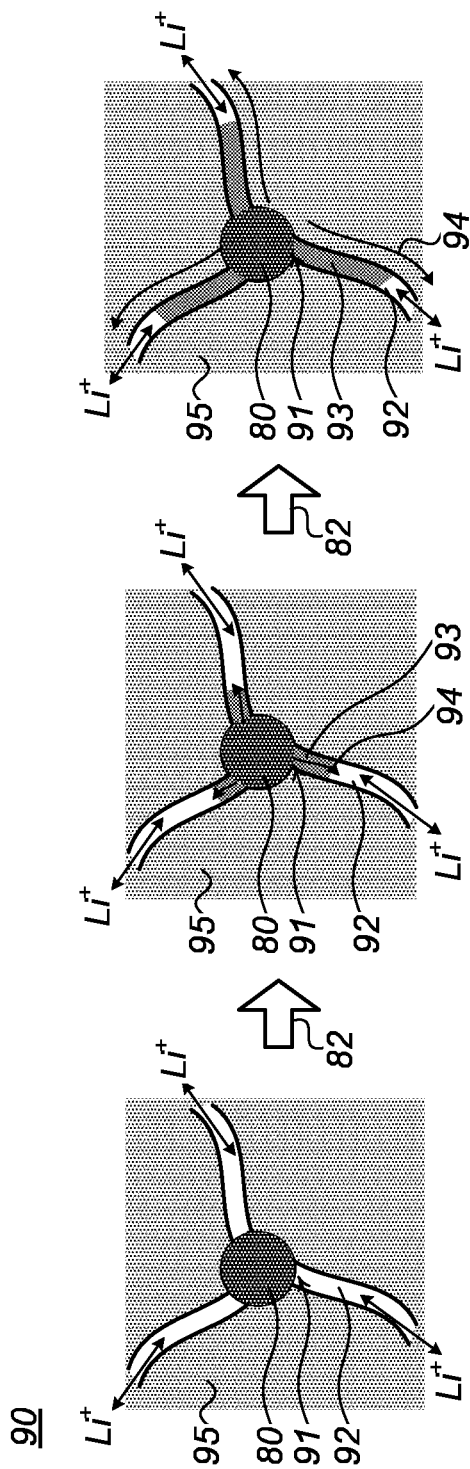
Figure 3A – prior art
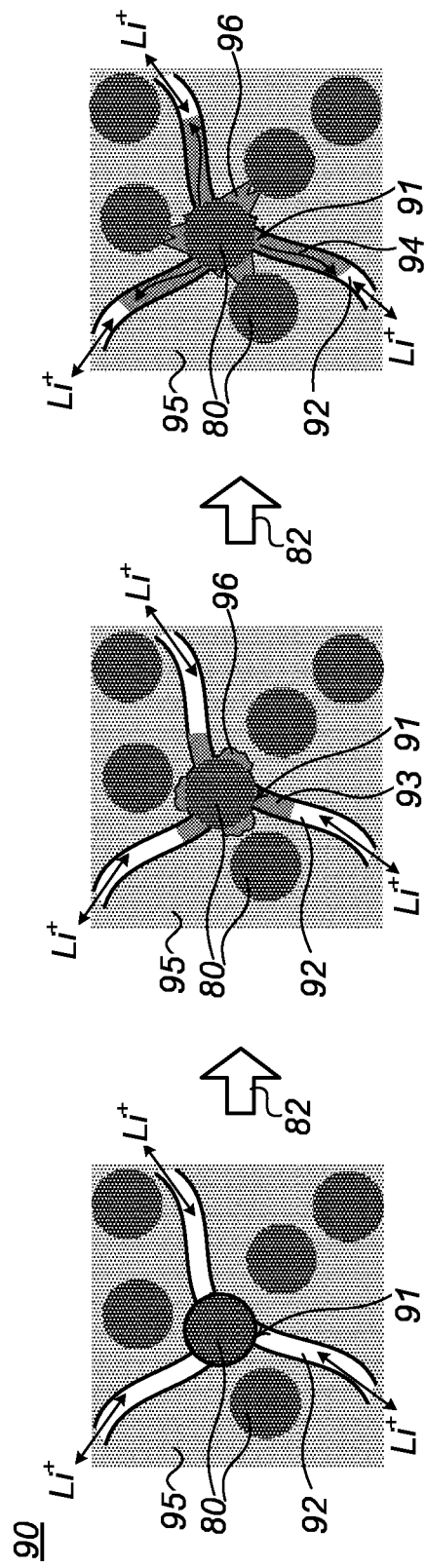
Figure 3B – prior art

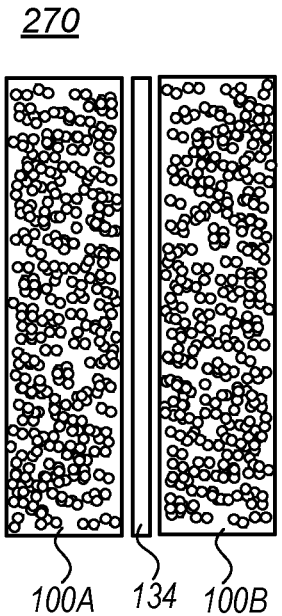
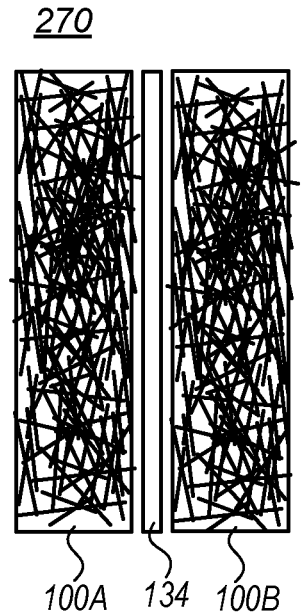
Figure 7A
Figure 7B
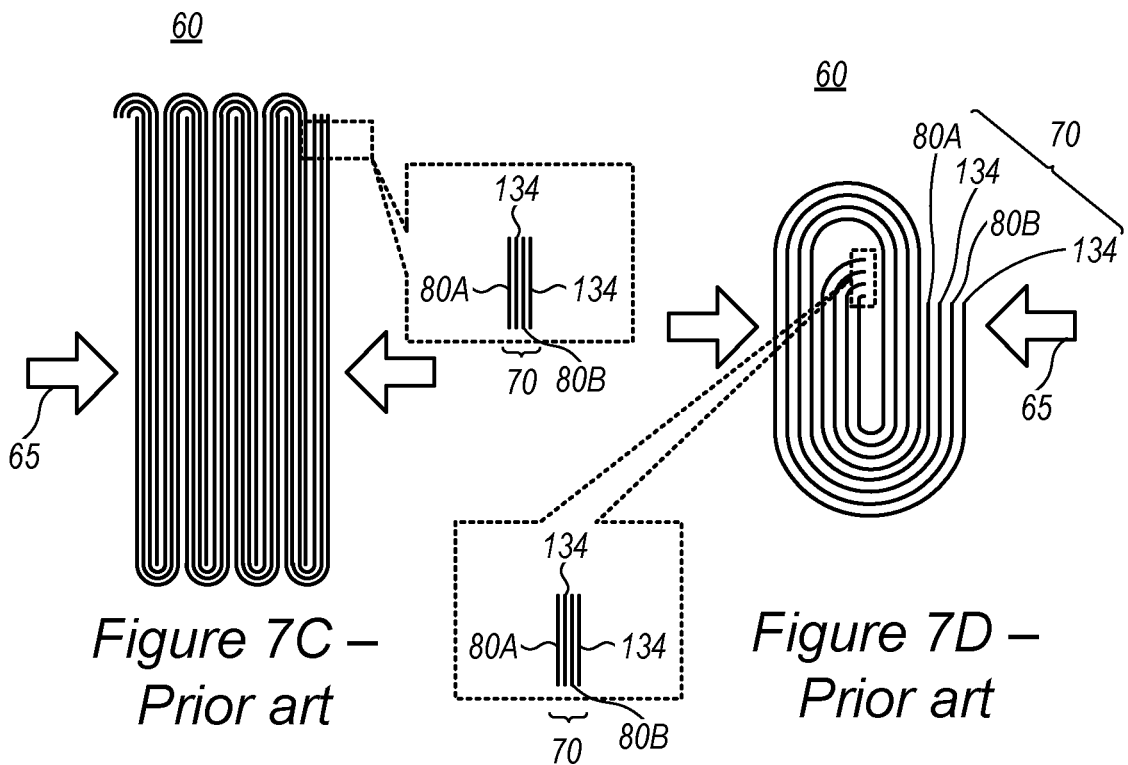
Figure 7C – Prior art
Figure 7D – Prior art

300

310
Preparing a raw anode from oxidized active material particles and a porous supporting structure that includes electron conductive elements and pores that provide ion conductive channels that interconnect the oxidized active material particles among themselves and to a surface of the raw anode

312
Optionally increasing amounts of binder(s) and/or conductive additive(s) during the preparation of the raw anode, to compensate for removal thereof during the following dry etching treatment

320
Applying a dry etching treatment to the raw anode to at least partly reduce the oxidized active material particles through the pores and yield the anode in an operable state

330
Stabilizing the anode mechanically after the dry etching treatment

332
Passivating the anode chemically after the dry etching treatment

334
Applying a post-treatment at least to a surface of the anode

340
Reducing the amounts or eliminating binder(s) and/or additive(s) and possibly the current collector as well, e.g., when using an electrically conductive metallic porous structure

345
Preparing the raw anode in an oxidizing environment, e.g., in a water-based slurry or in air

*Figure 8*

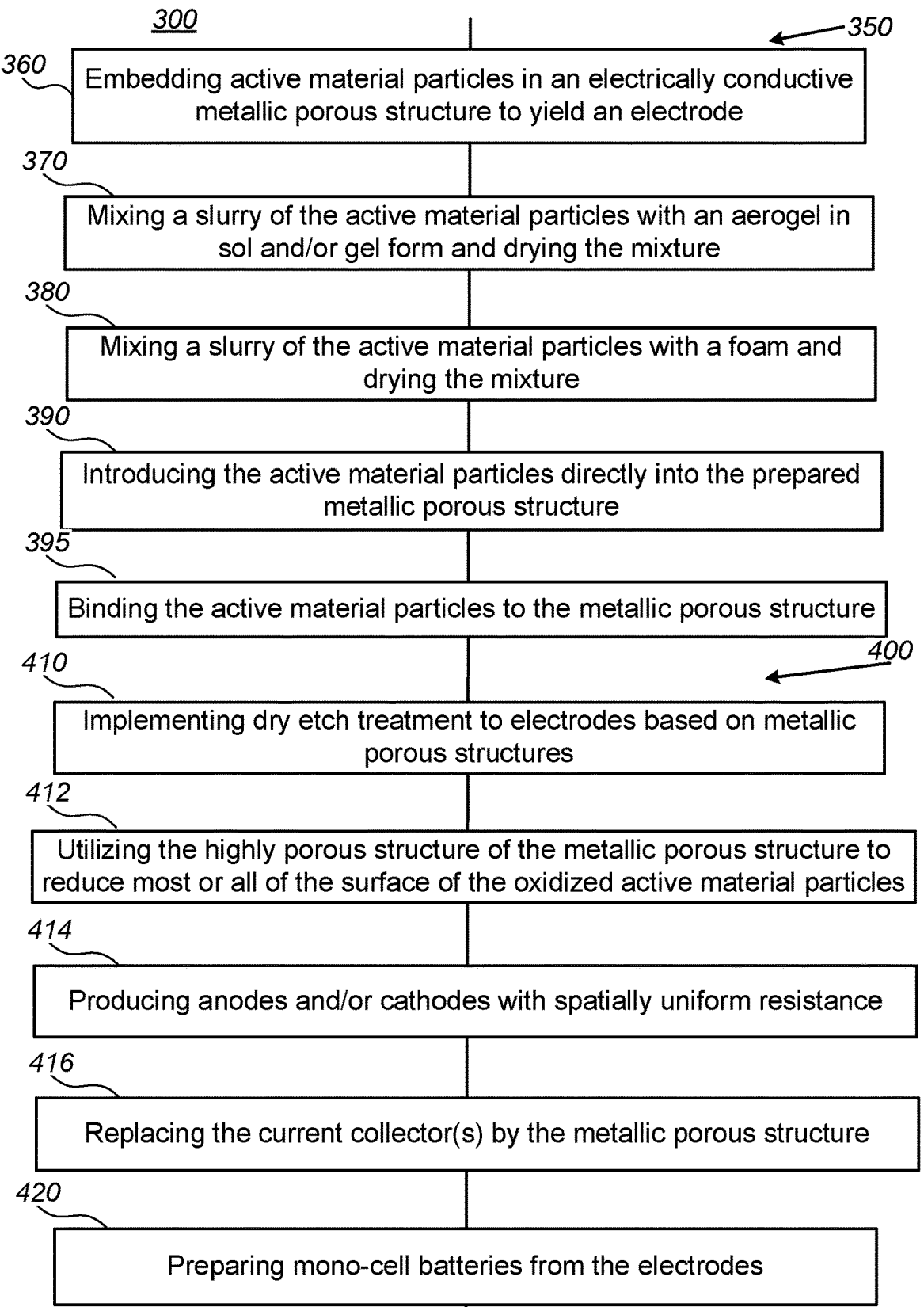
Figure 8 (continued, 1.)

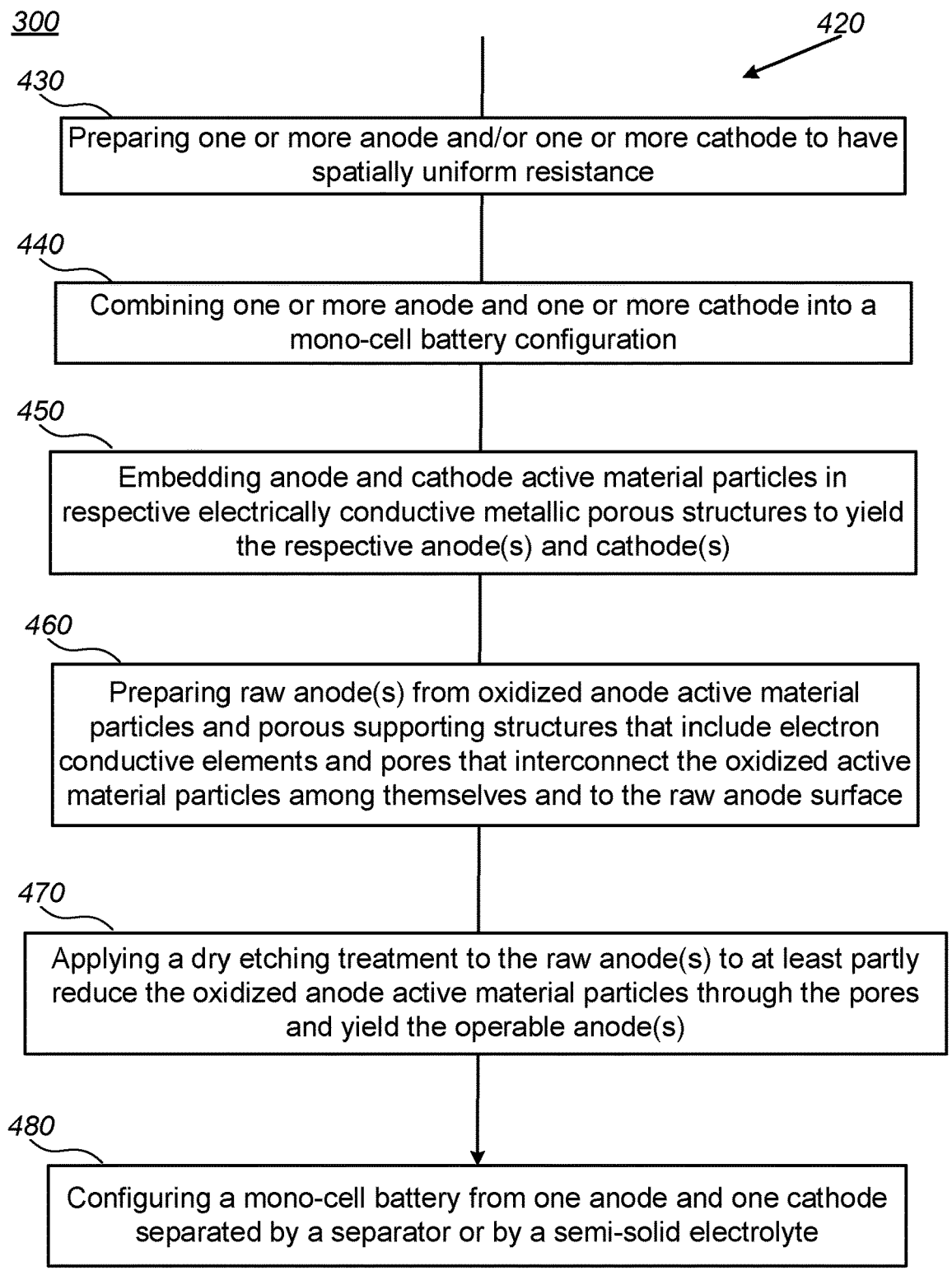
Figure 8 (continued, 2.)

MONO-CELL BATTERIES

BACKGROUND OF THE INVENTION

1. Technical Field

The present invention relates to the field of energy storage devices, and more particularly, to lithium ion batteries and electrodes thereof.

2. Discussion of Related Art

Energy storage devices, and particularly rechargeable batteries such as lithium ion batteries, are in high demand and continue to present performance and safety challenges. Lithium ion batteries are used for a growing range of applications, as their capacity and charging rates are increased. For example, metalloid-based anode materials such as Si, Ge, Sn and combinations thereof are used to deliver high performance lithium ion batteries.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides an electrode comprising active material particles embedded in electrically conductive metallic porous structure.

One aspect of the present invention provides a method of preparing an anode for a lithium ion battery, the method comprising: preparing a raw anode from oxidized active material particles and a porous supporting structure that includes electron conductive elements and pores that interconnect the oxidized active material particles among themselves and to a surface of the raw anode, and applying a dry etching treatment to the raw anode to at least partly reduce the oxidized active material particles through the pores and yield the anode in an operable state.

One aspect of the present invention provides a mono-cell battery comprising at least one anode and at least one cathode separated by at least one separator or by a semi-solid electrolyte, wherein the anode and the cathode comprise corresponding anode and cathode active material particles embedded in respective electrically conductive metallic porous structures.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 3A and 3B are high-level schematic illustration of prior art electrodes with active material particles embedded in binder material.

FIGS. 7A and 7B are high-level schematic illustrations of mono-cell batteries, according to some embodiments of the invention, compared with prior art battery configurations illustrated schematically in FIGS. 7C and 7D.

FIGS. 7C and 7D depict prior art.

FIG. 8 is a high-level flowchart illustrating a method, according to some embodiments of the invention.

DETAILED DESCRIPTION OF THE INVENTION

Figure 1A:
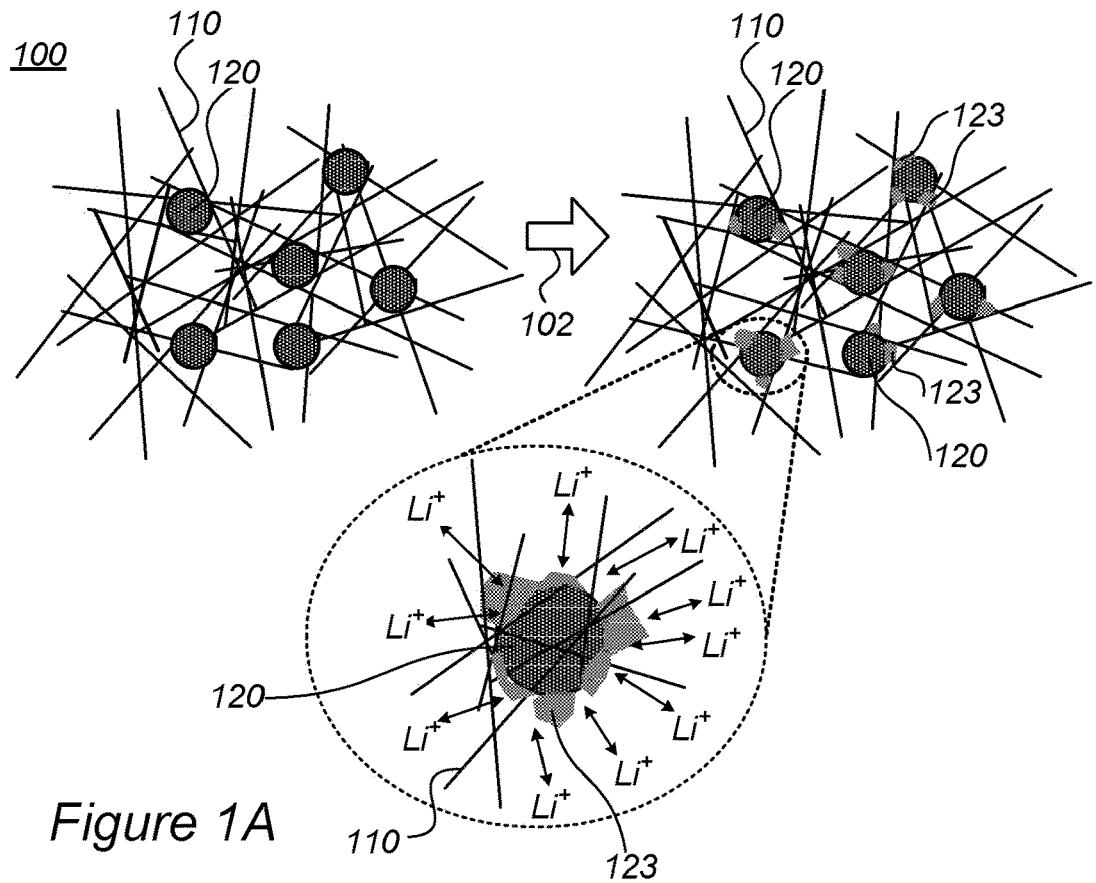
FIGS. 1A and 1B are high-level schematic illustrations of the structure of a section of an electrode, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Embodiments of the present invention provide efficient and economical methods and mechanisms for preparing electrodes, e.g., anodes, and thereby provide improvements to the technological field of energy storage devices.

Electrodes, production methods and batteries are provided, which comprise active material particles embedded in electrically conductive metallic porous structure. Anodes may comprise metalloid, metal and/or carbon-based anode active material particles in e.g., copper, nickel and/or titanium, their combinations and/or their alloy aerogel/foam, while cathodes may comprise any type of cathode material which may be embedded as primary nanoparticles (rather than prior art secondary conglomerates thereof) in aluminum or nickel or stainless-steel, their combinations and/or their alloy aerogel/foam. The metallic porous structure provides electric conductivity, a large volume that supports good ionic conductivity, that in turn reduces directional elongation of the particles during operation, and may enable reduction or removal of binders, conductive additives and/or current collectors to yield electrodes with higher structural stability, lower resistance, possibly higher energy density and longer cycling lifetime. Production may be facilitated by mixing active material particle slurry with aerogel and/or foam precursors, or binding the active material particles into the prepared metallic porous structure.

Systems and methods of preparing an anode for a lithium ion battery are provided. After preparing a raw anode from oxidized active material particles and a porous supporting structure that includes electron conductive elements and pores (and/or pores as ion conductive paths) that interconnect the oxidized active material particles among themselves and to a surface of the raw anode—a dry etching treatment is applied to the raw anode to at least partly reduce the oxidized active material particles through the pores to yield the anode in an operable state. Advantageously, the reduction (de-oxidation) is performed at the surface areas of the particles which contact the pores, to establish good ion conductivity of the anode.

Electrodes, production methods and mono-cell batteries are provided, which comprise active material particles embedded in electrically conductive metallic porous structure, dry-etched anode structures and battery structures with thick anodes and cathodes that have spatially uniform resistance. The metallic porous structure provides electric conductivity, a large volume that supports good ionic conductivity, that in turn reduces directional elongation of the particles during operation, and may enable reduction or removal of binders, conductive additives and/or current collectors to yield electrodes with higher structural stability, lower resistance, possibly higher energy density and longer cycling lifetime. Dry etching treatments may be used to reduce oxidized surfaces of the active material particles, thereby simplifying production methods and enhancing porosity and ionic conductivity of the electrodes. Electrodes may be made thick and used to form mono-cell batteries which are simple to produce and yield high performance, low resistance, uniform cell parameters and higher energy density.

Figure 1B:
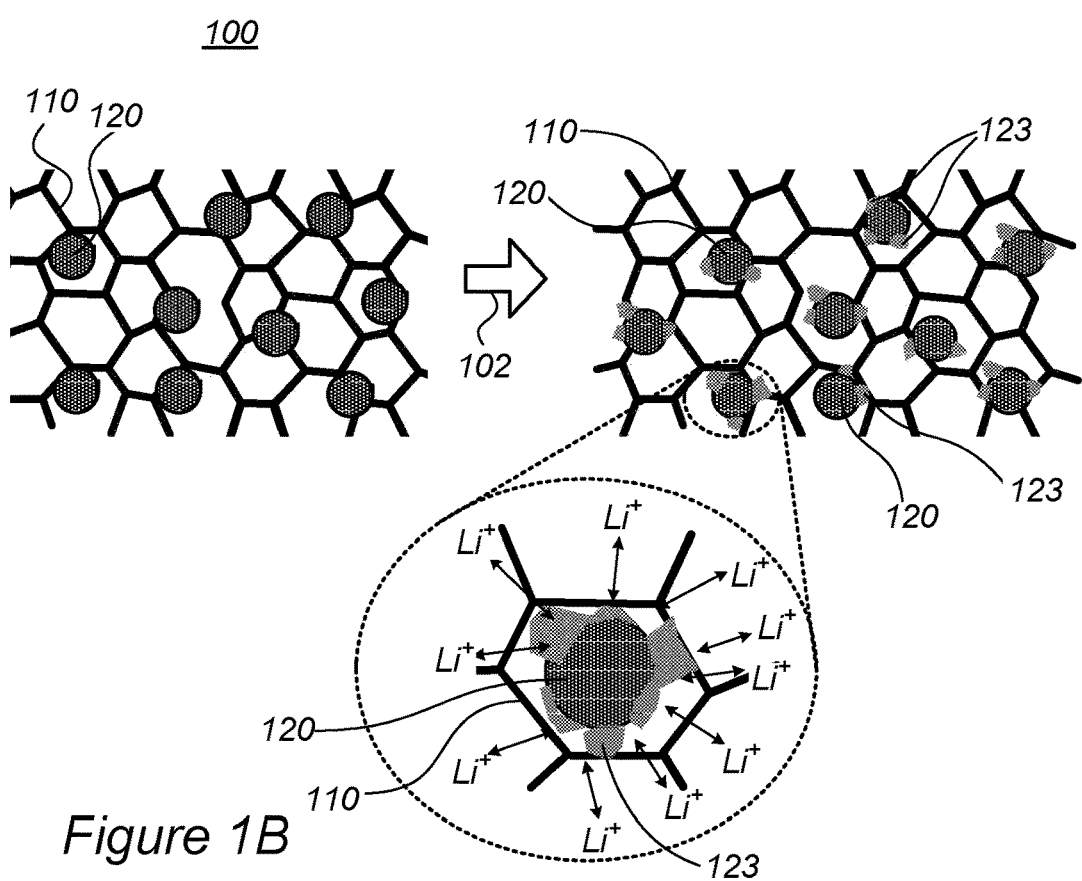

FIGS. 1A and 1B are high-level schematic illustrations of the structure of a section of an electrode 100, according to some embodiments of the invention. Electrode 100 comprises active material particles 120 embedded in electrically conductive metallic porous structure 110, such as aerogel and/or foam 110. FIG. 1A illustrates schematically, in a non-limiting manner the use of aerogel 110 while FIG. 1B illustrates schematically, in a non-limiting manner the use of foam 110. Metallic porous structure 110 may have various structural configurations, such as aerogels comprising an anisotropic assembly of wires or needles at a very small scale (e.g., having widths of few to tens of nanometers and lengths of tens or hundreds of nanometers to few micrometers) and/or dried foams such as open-cell foams comprising an anisotropic assembly of cell walls or parts thereof at a very small scale (e.g., having wall thicknesses of few to tens of nanometers). During operation (and/or possibly during formation) 102 of electrode 100, some structural deformation 123 of particles 120 may occur due to lithiation and de-lithiation of particles 120 which are accompanied by mechanical expansion and contraction, respectively, of particles 120. As most of the surrounding of particles 120 is ionic conductive, structural deformation 123 are expected to be relatively uniform in different directions (essentially isotropic), because lithium ions ($Li^+$) can enter and exit particles 120 over a wide range of spatial directions, as illustrated schematically in the enlarged portion of FIG. 1. Moreover, the limited extent of structural deformation 123 may be beneficial in anchoring particles 120 within metallic porous structure matrix 110, enhancing the mechanical stability of electrode 100.

Aerogels and/or foams 110 comprise highly porous, anisotropic solids, which may be made of electrically conductive materials, e.g., any of aluminum, nickel, copper, titanium, gold, stainless steel, their combinations and/or their alloys. Embedding active material particles 120 in electrically conductive metallic porous structure 110 provides several benefits, including light weight of the electrodes, reduction or elimination of prior art binders, good contact to (or replacement of) the current collector, high electric conductivity of the aerogel and/or foam material and high ionic conductivity resulting from the porosity of the aerogel structure. Moreover, as the aerogel is anisotropic, the irregular structure mechanically prevents excessive elongation of active material particles 120 in any specific direction. Foam 110 may comprise any three-dimensional metal foam. The thickness, density, structure and pore sizes may be optimized for the application, type of particles, solvent used for particles' deposition, total foil (current collector) resistance and other parameters of electrode 100. Advantageously, the deformation of active material particles 120 anchors them stronger into surrounding metallic porous structure 110 and enhances the mechanical stability of electrode 100.

In certain embodiments, electrode 100 may comprise an anode of a lithium ion cell (e.g., a fast-charging lithium ion cell) and active material particles 120 may be anode active material particles. For example, anode active material particles 120 may comprise metalloids such as Si, Ge and/or Sn particles 120 and/or particles 120 comprising alloys and/or mixtures of Si, Ge and/or Sn, possibly with additional materials such as forms of carbon. In certain embodiments, anode active material particles 120 may comprise metallic particles such as Mn-based and/or Fe-based particles, and/or carbon-based particles that include e.g., graphene and/or graphite. Certain embodiments comprise any combination of anode active materials disclosed above, such as metalloid, metal and carbon-based particles. In case of anodes, metallic porous structure 110 may comprise copper, nickel and/or titanium, their combinations and/or their alloy aerogel and/or foam and may be used to function both as matrix and as current collector of the anode.

Figure 2A:
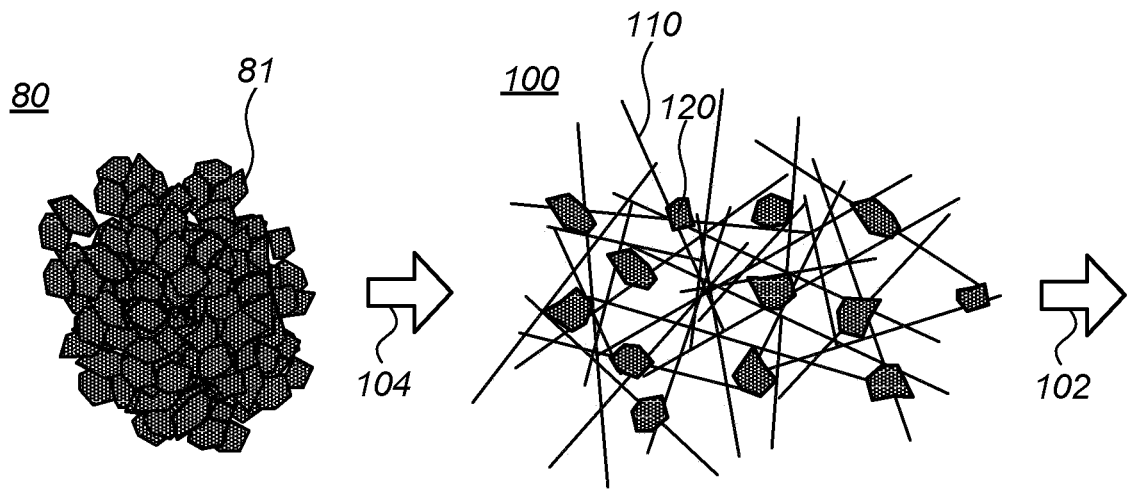
FIGS. 2A and 2B are high-level schematic illustrations of the use of cathode material primary nanoparticles, according to some embodiments of the invention, instead of prior art secondary conglomerates thereof.
Figure 2B:
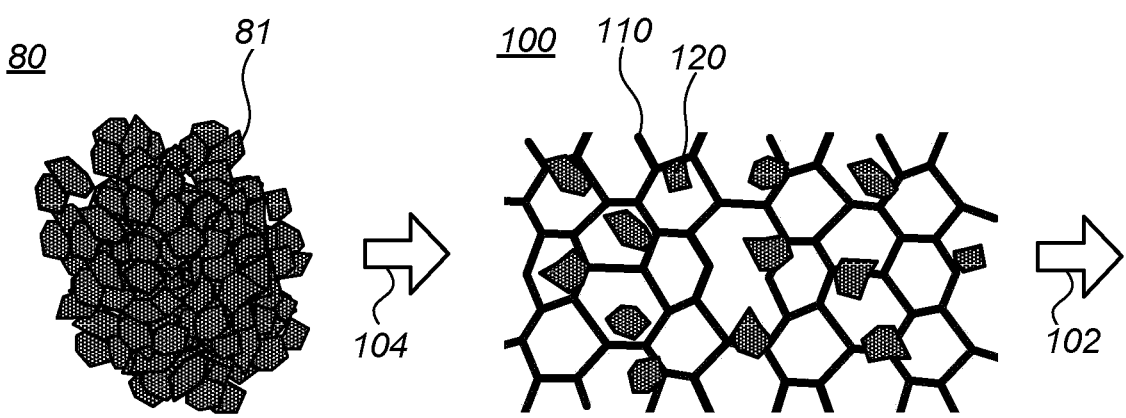

In certain embodiments, electrode 100 may comprise a cathode of a lithium ion cell (e.g., a fast-charging lithium ion cell) and active material particles 120 may be cathode active material particles, for example NCA-based formulations (lithium nickel cobalt aluminum oxide, based on $LiNiCoAlO_2$) and/or NMC-based formulations (lithium nickel cobalt manganese oxide, based on $LiNiCoMnO_2$) particles. In some embodiments, cathode active material may comprise any of LMO-based formulations (lithium manganese oxide, based on $LiMn_2O_4$), LNM-based formulations (lithium nickel manganese spinel, based on LiNi$_{0.5}$Mn$_{1.5}$O$_4$), LCO-based formulations (lithium cobalt oxide, based on LiCoO$_2$), LFP-based formulations (based on LiFePO$_4$), lithium rich cathodes and/or combinations thereof. Specific formulations may comprise mixtures and modifications of any of the cathode materials listed above. In certain embodiments, cathode active material particles 120 may comprise single grains (primary particles) of cathode material, e.g., nanoparticles at the scale of ten to several hundreds of nanometers in diameter, instead of prior art cathode material particles 80 which are conglomerates (secondary particles) of cathode material (primary) nanoparticles 81 and are at the scale of few (e.g., one) to several hundreds of micrometers in diameter. In certain embodiments, cathode material grains may be grouped in groups smaller than ten grains per particle. The inventors have found out that using metallic porous structure 110 as the supportive structure for cathode active material nanoparticles 120 enables use of single or few cathode material nanoparticles as cathode active material nanoparticles 120 rather than prior art use of conglomerates 80 that include many hundreds of nanoparticles 120, as illustrated schematically in a non-limiting manner in FIGS. 2A, 2B for aerogel 110 and foam 110, respectively—by use 104 of nanoparticles 120 in the cathode, according to some embodiments of the invention, rather than conglomerates 80 of primary nanoparticles 81 as in the prior art. While in the prior art, secondary (conglomerate) cathode material particles are required to increase the mechanical stability of the cathode, disclosed embodiments provide enhanced mechanical stability through the use of metallic porous structure 110 and therefore allow using smaller particles for the active material. Advantageously, disclosed embodiments provide cathodes with greatly increased ratio of surface area to volume of cathode material (nano)particles 120 in comparison to prior art cathode material particles 80. In case of cathodes, metallic porous structure 110 may comprise aluminum, nickel and/or stainless-steel their combinations and/or their alloy aerogel and/or foam.

In certain embodiments, active material particles 120 may be bound to metallic porous structure 110 to enhance the stability and operability of the electrode. For example, cathode active material particles 120 may be bound to metallic porous structure 110 to enhance the cathode stability (as cathode active material particles typically exhibit less or not elongation compared to anode active material particles, in which elongation may be utilized to anchor them in metallic porous structure 110).

In certain embodiments, active material particles 120 may be mixed into metallic porous structure 110 either by mixing a slurry thereof with a liquid precursor of metallic porous structure 110 such as aerogel sol and/or gel before drying, and/or foam before drying; and/or by inserting active material particles 120 into prepared (e.g., dried) metallic porous (three dimensional) structure 110, e.g., into pores of the aerogel/foam 110. Advantageously, liquid mixture may be made uniform more easily than dry insertion, while direct insertion is less sensitive to the particle size distribution than the liquid method. Certain embodiments combine liquid and dry introduction of active material particles 120 into metallic porous structure 110, possibly with respect to particle size distribution parameters. Certain embodiments comprise conducting reactions on active material particles 120 after embedding them in metallic porous structure 110, e.g., binding reactions between active material particles 120 and metallic porous structure 110, and/or modification or synthesis of active material particles 120 such as reduction (de-oxidation) or alloying (in case metallic porous structure 110 withstands the required temperatures). In certain embodiments, reactions of active material particles 120 may be carried out during the drying of metallic porous structure 110.

In any of the disclosed embodiments, electrodes 100 may comprise metallic porous structure(s) 110 such as aerogel and/or foam 110 as full or at least partial replacement of binder(s) and/or additive material(s) that are used in the matrix of prior art electrodes (see FIGS. 3A and 3B). Advantageously, electric conductivity of metallic porous structure(s) 110 such as aerogel and/or foam 110 may allow not using, or using less conductive additives, and the structure of aerogel and/or foam 110 may allow not using, or using less binder material. Moreover, ionic conductivity is enhanced by using aerogel and/or foam 110 due to increase in particle surface area which is available for receiving and providing lithium ions. Advantageously, using metallic porous structure(s) 110 such as aerogel and/or foam 110 to support active materials particles 120 may enhance the mechanical stability of electrode, resulting in extended cycle life of the lithium ion cell. Moreover, as at least some of the binder material and conductive additives (e.g., carbon, carbon nanotubes) may be removed, the energy density of electrode 100 may be increased, e.g., by increasing the proportion of active material with respect to prior art. For example, typical prior art electrodes include 2-15 wt %, or possibly 0-40 wt % of binders such as PAA (polyacrylic acid), CMC (carboxymethyl cellulose) and/or PVDF (polyvinylidene difluoride). Typical prior art electrodes include 0-15 wt % conductive additives, e.g., at weight ratios of 5:7:88 or 5:0:95 of binder: conductive additives: NCA for NCA-based cathodes. Typical prior art anodes include up to 40 wt % conductive additives, e.g., at weight ratios of 70:15:15 or 33:33:33 of silicon: binder: conductive additives for Si anodes. Finally, additional advantages comprise a significant reduction in the resistance of electrode 100 due to the overall increase in electric conductivity via metallic porous structure 110 and ionic conductivity over the larger exposed surface area. The lower electrode resistance leads in turn to better overall performance that may include higher C-rate capabilities, lower operation temperatures, slower degradation rates, etc., with respect to the prior art.

In certain embodiments, disclosed electrode configurations, with metallic porous structure 110 supporting active material particles 120, may be implemented in a range of battery technologies other than lithium ion cells, such as Na-ion or Li—S battery or supercapacitors systems, as well as to anodes comprising any of: carbon-based materials and/or elements of any of IA (Li), IIA (Mg), IIIA (Al, Ga, In), IVA (Si, Ge, Sn, Pb), VA (P, As, Sb, Bi), IB (Ag, Au), and IIB (Zn, Cd) groups of the periodic table—which have been used in Li-ion, Na-ion and/or Li—S battery or supercapacitor systems.

FIGS. 3A and 3B are high-level schematic illustration of prior art electrodes 90 with active material particles 80 embedded in binder material 95. FIG. 3A illustrates schematically preferred elongation of anode active material along pores as ionic conductivity paths 92 and FIG. 3B illustrates more realistic particle density which block elongation in other directions, leading to strongly anisotropic particle elongation with the isotropic binder material 95. Both figures illustrate schematically the gradual elongation of anode active material particles 80 along a few spatial directions 94 as a result of repeated lithiation and de-lithiation through pores as ionic conductive paths 92.

In the prior art, active material particles 80 are embedded in essentially isotropic matrix 95 that comprises binder material and conductive additives to form electrodes 90 (only a small section thereof is illustrated), be it anode active material particles used to form anodes or cathode active material particles used to form cathodes. Matrix 95 is essentially isotropic and requires formation and/or maintenance of ionic conductivity through matrix 95 to active material particles 80. Typically, pores that serve as ionic conductivity paths 92 are formed, which contact active material particles 80 over relatively small portions 91 of the surface area of active material particles 80. During operation (and possibly during formation) 82 of the electrode, as the battery is repeatedly charged and discharged, active material particles 80 are repeatedly lithiated and delithiated (indicated schematically as $Li^+$ ions entering and exiting particles 80 through pores as ionic conductivity paths), causing, in case of anodes of fast-charging batteries, gradual elongation 93 of anode active material particles 80 in few spatial directions (denoted 94) that correspond to their contact regions 91 with pores as ionic conductive paths 92—because the lithium ions accumulate and cause elongation primarily via contact regions 91 through which they enter and exit anode material particles 80. Consequently, anode active material particles 80 become very elongated (93) along a few directions 94, causing structural and electrochemical instability of the electrode, raising safety issues and reducing the cycling lifetime of the cell. It is noted that expansion of the anode material may also occur along directions 96 other than pores as ionic conductivity paths 92, however at lower rates and at a smaller extension, as neighboring particles 80 typically block mechanically further expansion (in FIG. 3B particles 80 are illustrated in their typically more crowded distribution within matrix 95). Moreover, as pores and ionic conductive paths 92 are typically few and their contact regions 91 are small, material elongation 93 is typically highly unbalanced over the surface area of particles 80, leading to further mechanical instability of the anode. While such elongation typically does not occur in cathodes due to the different material structure. Moreover, as illustrated above, active material particles cathodes of fast-charging cells are typically used as conglomerates of smaller nanoparticles, which in the cases disclosed above—may be modified (see FIGS. 2A, 2B).

Figure 4:
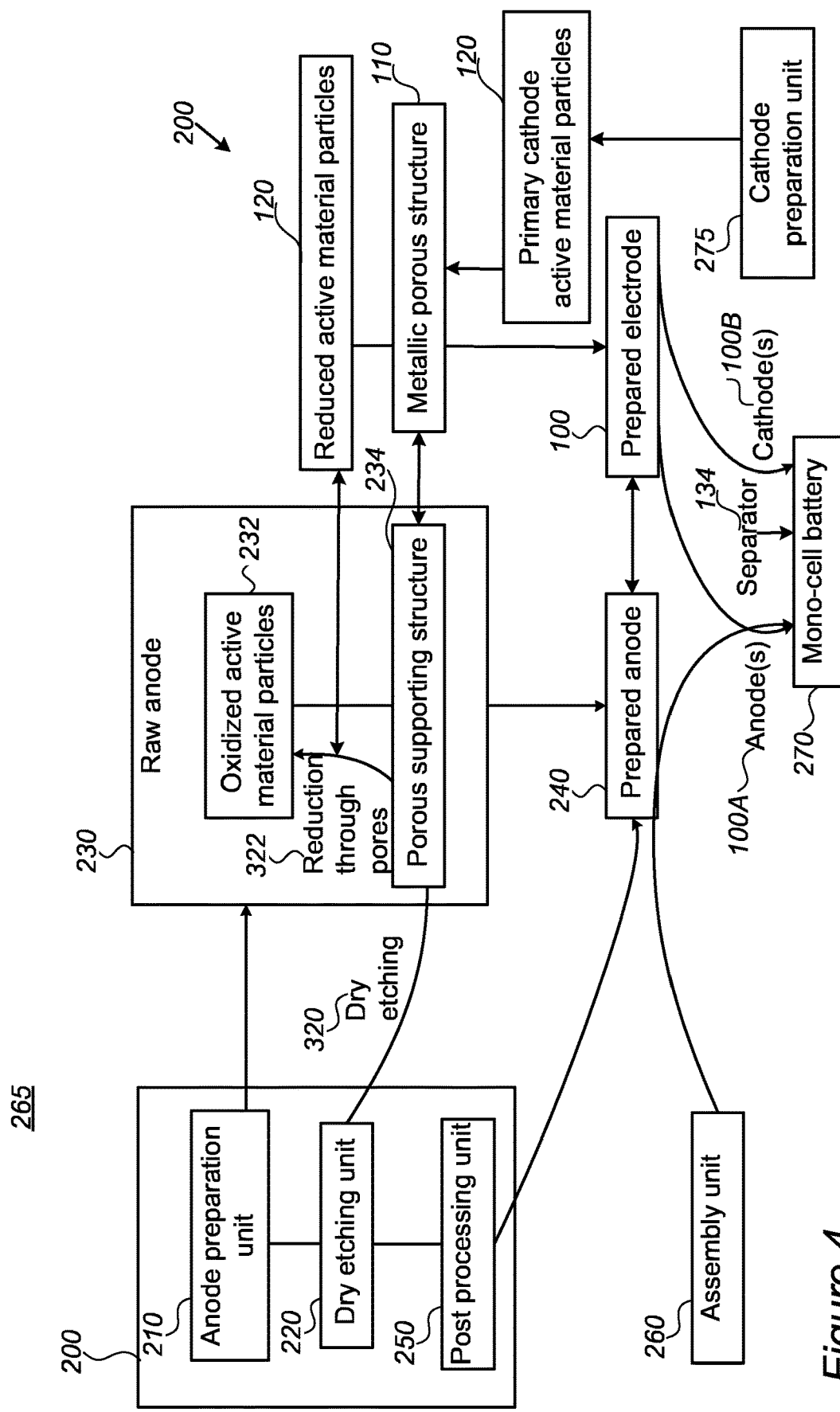
FIG. 4 is a high-level schematic block diagram of systems for anode preparation and for preparing mono-cell batteries, according to some embodiments of the invention.
Figure 5A:
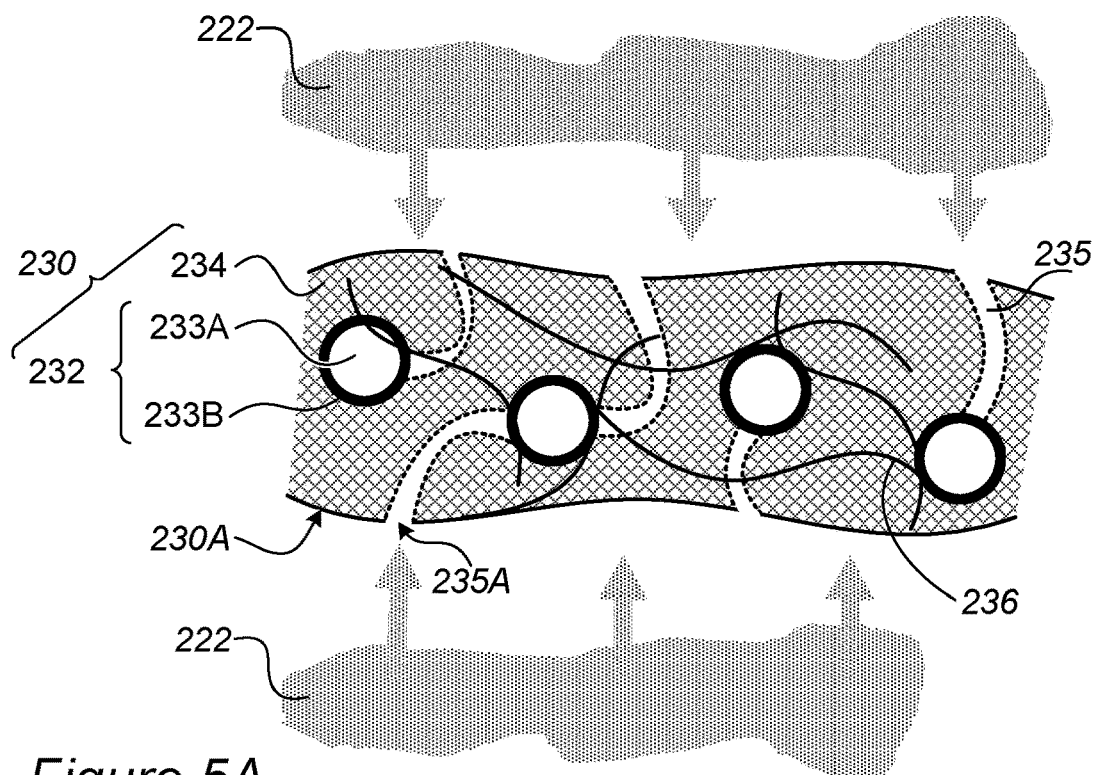
FIGS. 5A and 5B are schematic high-level illustrations of a raw anode in schematic cross-section and a RIE (reactive-ion etching) plasma treatment application that yields prepared anode, respectively, according to some embodiments of the invention.
Figure 5B:
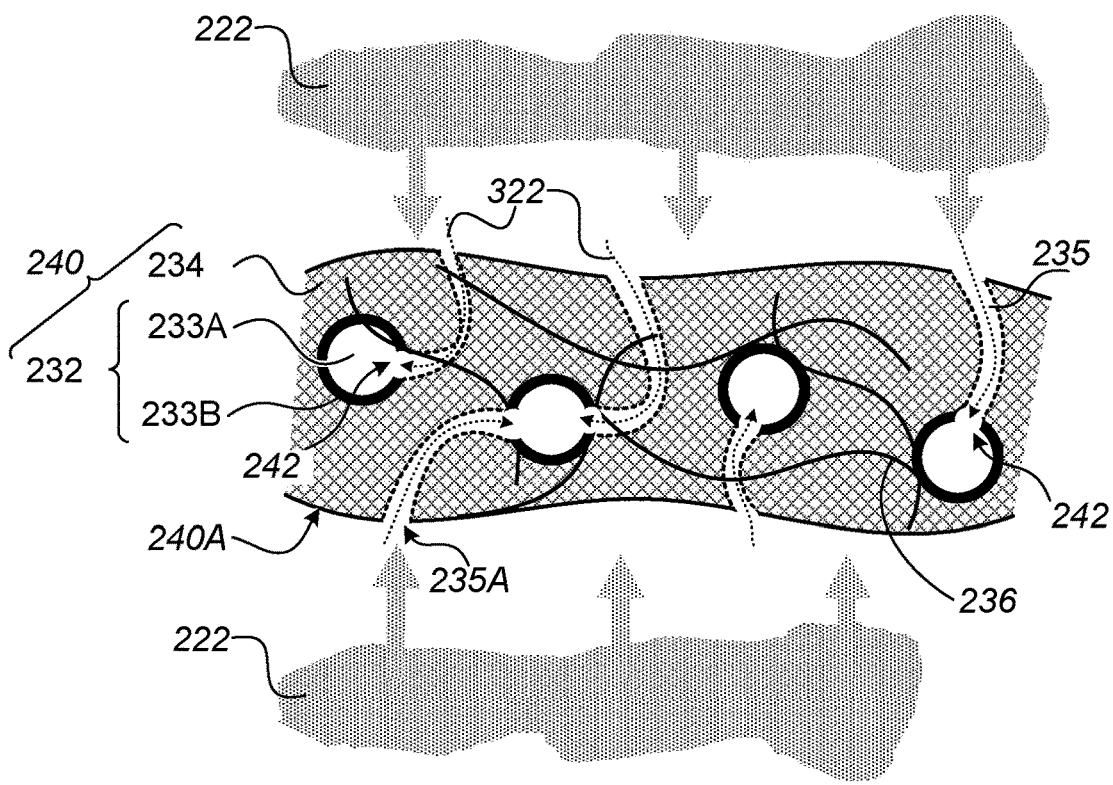
Figure 5C:
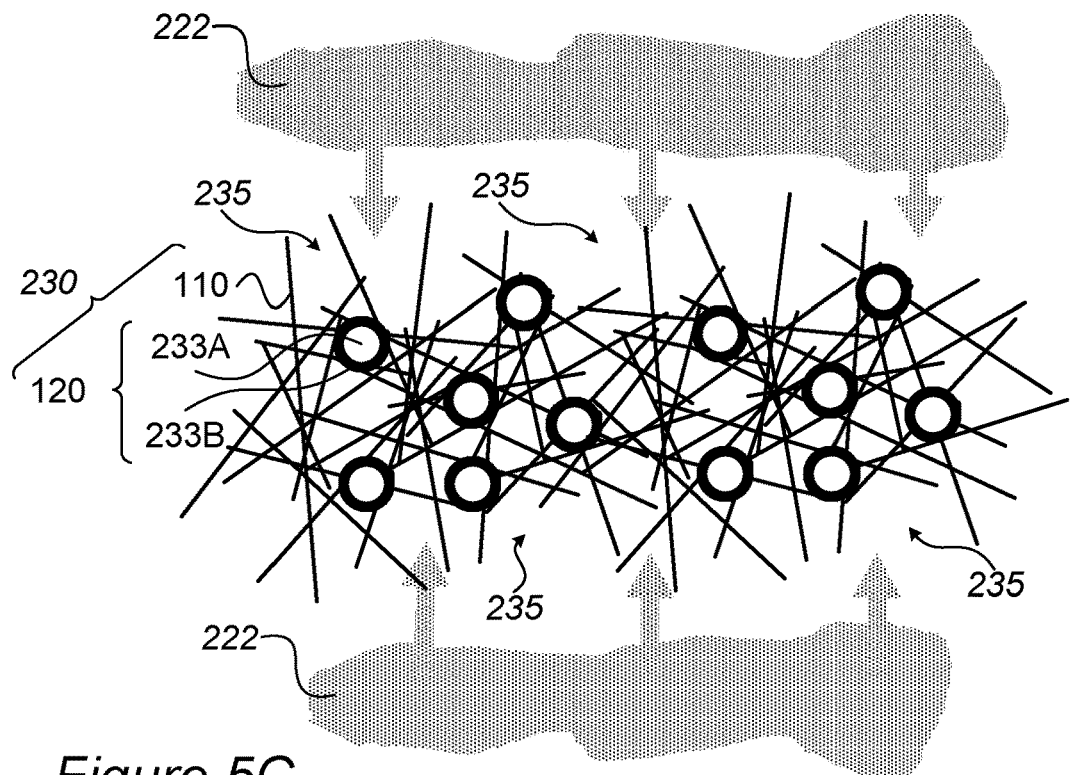
FIGS. 5C-5F are schematic high-level illustrations of raw anodes in schematic cross-section and dry etching treatment application that yields prepared anodes, according to some embodiments of the invention.
Figure 5D:
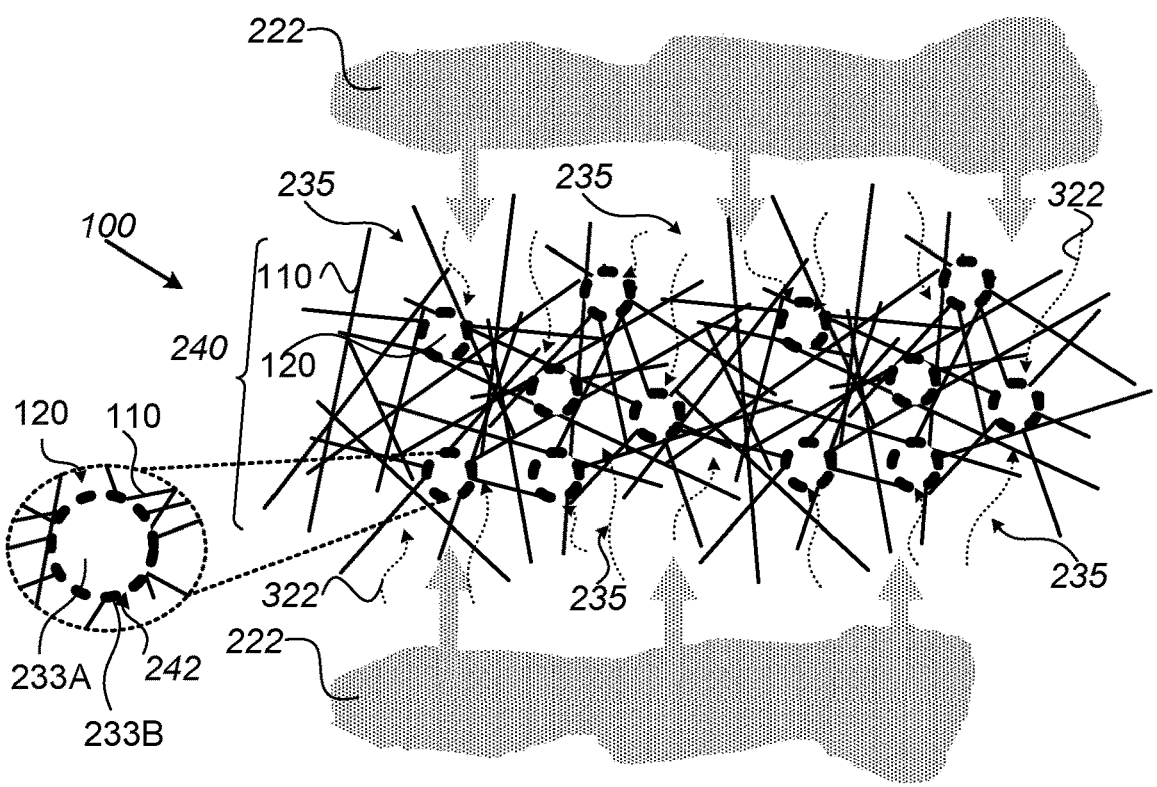
Figure 5E:
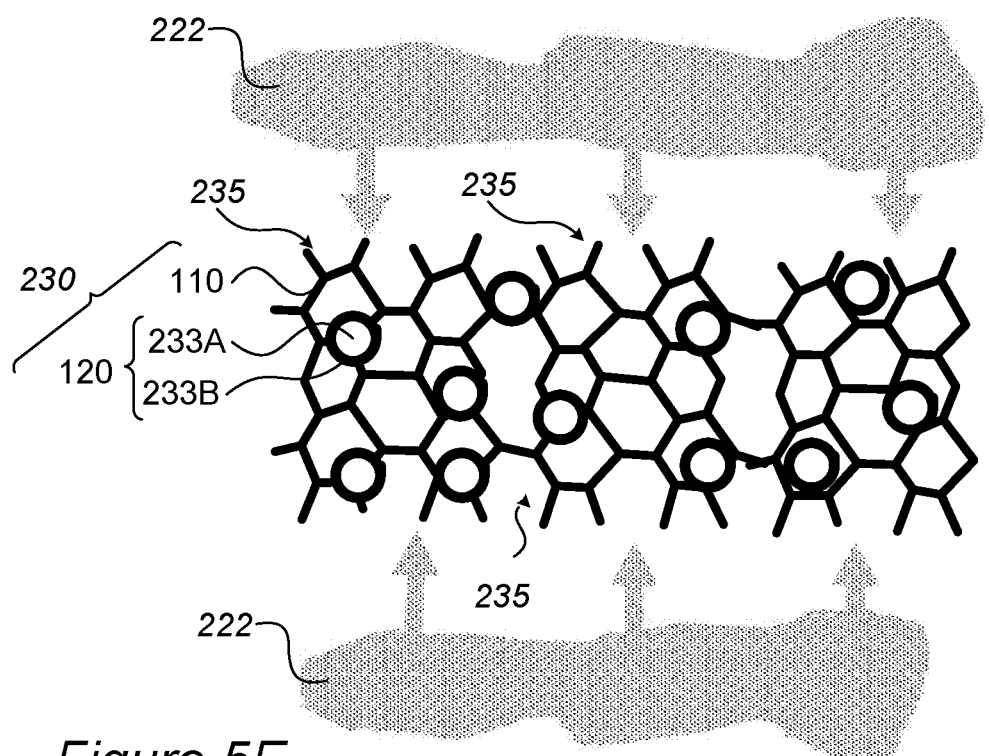
Figure 5F:
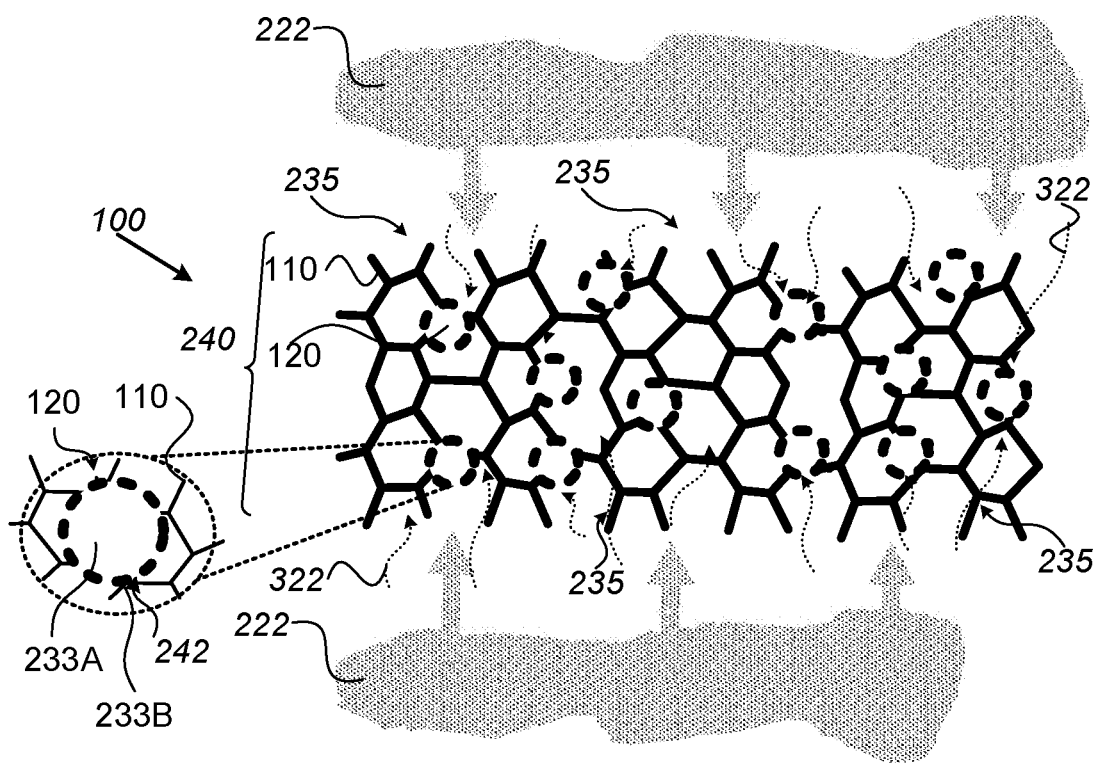

FIG. 4 is a high-level schematic block diagram of a system for anode preparation and for preparing mono-cell batteries, according to some embodiments of the invention. FIGS. 5A and 5B are schematic high-level illustrations of raw anode 230 in schematic cross-section and dry etching treatment application 320 (for example, different types of RIE, plasma etchers, ion enhanced etchers) that yields prepared anode 240, respectively, according to some embodiments of the invention. FIGS. 5C-5F are schematic high-level illustrations of raw anode 230 in schematic cross-section and dry etching (for example, RIE) treatment application 320 that yields prepared anode 240, respectively, according to some embodiments of the invention. It is noted that dry etching treatment 320 may comprise in various embodiments any of: different types of RIE—reactive-ion etching, such as induced coupled plasma (ICP), deep RIE (DRIE), planar etch (PE), transformer coupled plasma (TCP), electron cyclotron resonance (ECR) as well as various plasma etchers and ion enhanced etchers.

System 200 comprises an anode preparation unit 210 configured to prepare a raw anode 230 from oxidized active material particles 232 (e.g., comprising active material 233A at least partly covered by an oxide layer 233B) and a supporting structure 234 that includes electron conductive elements 236 and pores that serve as ion conductive paths 235 that interconnect oxidized active material particles 232 among themselves and to a surface 230A of raw anode 230.

System 200 and/or anode preparation unit 210 further comprises a dry etching unit 220 (for example, different types of RIE, plasma etchers, ion enhanced etchers) configured to apply a dry etching treatment 320 to raw anode 230, to at least partly reduce oxidized active material particles 232 through pores and paths 235 (indicated schematically by numeral 322) and yield a prepared anode 240, ready for assembly and use in a battery.

In certain embodiments, anode preparation unit 210 may be configured to embed oxidized active material particles 232 in electrically conductive metallic porous structure 110 as porous supporting structure 234. In certain embodiments, the amount of binder(s) and/or additive(s) may be reduced or even binder(s) and/or additive(s) may be removed completely, e.g., to yield binder-free prepared anodes 240 (possibly also binder-free raw anodes 230), e.g., as electrically conductive metallic porous structure 110 may provide sufficient cohesivity to the electrode.

In certain embodiments, anode preparation unit 210 may be configured to prepare raw anode 230 in an aqueous (water-based) environment, such as in a water-based slurry, or in any other potentially oxidizing environment, such as air. Advantageously, as active material particles 232 in raw anode 230 are oxidized (and are at least partly de-oxidized, or reduced, during dry etching treatment 320), preparation processes may be simplified significantly, and have enhanced productivity and safety, as oxidized active material particles 232 are much less reactive than prior art non-oxidized active material particles.

Dry etching treatment 320 (e.g., different types of RIE, plasma etchers, ion enhanced etchers) may be performed as dry etching under low pressure, applying high-energy ions from the plasma to attack surface regions of oxidized active material particles 230 and de-oxidize (reduce) them. Various inert and reactive chemistries may be used for dry etching treatment 320, e.g., fluorocarbons, oxygen, chlorine, boron trichloride with or without addition of nitrogen, argon, helium, methane, hydrogen and/or other gases.

In certain embodiments, dry etching treatment 320 may be configured to enhance the porosity and/or modify the structure of the treated electrode(s), e.g., to further enhance any of the electrode's ion conductivity, the electrode's interface with the electrolyte and wettability thereby, the electrode's mechanical stability etc.

In various embodiments, system 200 may further comprise a post-processing unit 250 configured to stabilize the anode mechanically and/or passivate the anode chemically after the dry etching treatment, and/or to apply a post-treatment at least to surface 240A of prepared anode 240. For example, any of temperature treatment, pressure application, light irradiation and/or solvent exposure, may be used to post-treat anode 240, to stabilize the anode structure and/or to enhance electron and/or ion conductivity thereof. In certain embodiments, reactions between anode material particles 232 and porous structure 234 may be initiated to further stabilize anode 240. In certain embodiments, reactions may occur not only between active material particles and the porous structure, but also with the binder and conductive additives, e.g., under certain environmental conditions such as specific values of pressure, temperature, light, certain solvents, etc. In certain embodiments, the amounts of binder(s) and/or conductive additive(s) may be increased during the preparation of raw anode 230, to compensate for removal thereof during dry etching treatment 320 and enhance the stability of prepared anode 240.

In certain embodiments, dry etching treatment 320 may be applied to electrodes 100 made of active material particles 120 embedded in electrically conductive metallic porous structure 110, such as aerogel and/or foam 110, as exemplified below. In certain embodiments, disclosed electrodes may have a reduced amount of binders and/or additives, and possibly even no binders and/or additives, and may comprise solely active material particles 232 and porous structure 234. Moreover, electrically conductive metallic porous structure 110 may at least partly, or fully, replace the current collector, to make the electrode resistance more uniform and spare additional material and volume.

As illustrated schematically in FIG. 5A, anode preparation unit 210 is configured to yield raw anode 230 with porous structure 234 having pores 235A and ion conductive paths 235 that interconnect particles 232 among themselves and to surface 230A—by mixing respective materials, e.g., in a slurry that can be water-based, to assure the required interconnections. Electron conductive elements 236 may comprise carbon in any of its forms, e.g., carbon, carbon fibers, carbon nanotubes etc., as e.g., taught by U.S. patent application Ser. No. 15/414,655, incorporated herein by reference in its entirety, and may likewise by applied in the anode preparation process in a way that interconnects particles 232 among themselves and to surface 230A.

FIG. 5B schematically illustrates the utilization of pores 235A and/or paths 235 that contact, at contact regions 242, oxidized active material particles 232 embedded in porous structure 234—to introduce dry etching material 222 (e.g., plasma or other ionized material, such as in different types of RIE, plasma etchers, ion enhanced etchers) that penetrates through pores 235A and/or paths 235, to reduce (de-oxidize) at least contact regions 242 on particles 232 (indicated schematically by arrows 322), and to establish the ionic conductivity of porous structure 234 with respect to treated particles 232—by removing at least some of oxide layer 233B from contact regions 242. It is noted that in case some of oxide layer 233B remains on particles 232, it does not reduce the ion conductivity of particles 232 and of anode 240, as such remains are anyhow not available to Li ions due to low ionic conductivity at their location. It is further noted, that remaining parts of oxide layer 233B also do not impede electron conductivity, e.g., as metalloid oxides, especially with low thickness, are typically electron-conductive. Therefore, both electron and ion conductivity from anode surface 240A to active material particles 232 are provided by disclosed methods and systems. It is noted that disclosed anodes 240 may be used with any of liquid, solid and/or semi-solid (e.g., polymer and/or gel) electrolytes, as well as combinations thereof, through which lithium ions reach anode surface 240A and active material particles 232, e.g., at least along same pores 235A and/or ion conductive paths 235 through which dry plasma treatment 222 (indicated schematically by arrow 322), and possibly through additional pores that may have been made available by the dry etch treatment.

In various embodiments, dry etching treatment 320 (e.g., different types of RIE, plasma etchers, ion enhanced etchers) may be applied to electrodes 100 made of active material particles 120 embedded in electrically conductive metallic porous structure 110, such as aerogel and/or foam 110 (see also FIG. 4). Such combinations simplify the production of electrodes 100 as active material particles 120 can be processed and embedded in electrically conductive metallic porous structure 110 without avoiding their surface oxidation, while dry etching treatment 320 may be made simpler by highly porous structure 110.

For example, as illustrated schematically in FIGS. 5C, 5E and 5D, 5F anode preparation unit 210 may configured to yield raw anode 230 (FIGS. 5C, 5E) with metallic porous structure 110 that provides ion conductive paths 235 that interconnect particles 120 among themselves and to the surface of metallic porous structure 110. The highly porous structure of metallic porous structure 110, e.g., as aerogel (FIGS. 5C, 5D) and/or foam (FIGS. 5E, 5F), ensures extensive access of dry etching treatment 320 (e.g., plasma or other ionic material 222, such as comprising inert and reactive chemistries such as any of argon, helium, methane, hydrogen, nitrogen, oxygen, chlorine, boron trichloride, fluorocarbons or combinations thereof) to oxide surface 233B of active material particles 120. Application of dry etching 320 (FIGS. 5D, 5F) utilizes pores and paths 235 in metallic porous structure 110 to reduce at least parts of oxidized surface 233B (indicated schematically by arrows 322) to yield multiple ion conductive regions 242 on the surface of active material particles 120 providing access for lithium ions to the particle's internal active material 233A. The high porosity of metallic porous structure 110 ensures efficient reduction of oxide layer 233B and consequently high efficiency of lithiation and de-lithiation of active material particles 120 and electrodes 100. In certain embodiments, disclosed electrodes may be binder-free, being composed only of metallic porous structure 110 and active material particles 120. Resulting prepared electrodes 100 such as prepared anodes 240 are highly efficient in fast-charging lithium cells, and maintain structural stability and electric conductivity due to metallic porous structure 110, as explained above.

Referring back to FIG. 4, certain embodiments comprise battery preparation systems 265 which comprise anode preparation unit 210 configured to prepare raw anode(s) 230 from oxidized anode active material particles 232 and porous supporting structure 234 that includes electron conductive elements and pores that interconnect the oxidized anode active material particles among themselves and to a surface of raw anode(s) 230, and/or by embedding oxidized anode active material particles 232 in electrically conductive metallic porous structure 110 to yield raw anode(s) 230; dry etching unit 220 configured to apply dry etching treatment 320 to raw anode(s) 230 prepared in either method, to at least partly reduce the oxidized anode active material particles through the pores and yield anode(s) 240 and/or 100 in operable state; and an assembly unit 260 configured to assemble a mono-cell battery 270 from one (or more) anode(s) 240 and/or 100A and one (or more) cathode(s) 100B which have a spatially uniform resistance, e.g., prepared by embedding primary cathode active material particles in corresponding electrically conductive metallic porous structure 110. It is noted that FIG. 4 illustrates schematically multiple alternative and/or optional components of systems 265 and electrodes 100 which may be combined in various ways to yield disclosed embodiments.

In non-limiting examples, the anode active material particles may comprise particles of any of metalloids comprising Si, Ge and/or Sn, metals comprising Mn and/or Fe particles, and/or carbon-based material comprising graphite and/or graphene and the anode electrically conductive metallic porous structure may comprise aerogel and/or foam that comprise copper, nickel and/or titanium, their combinations and/or their alloys.

In certain embodiments, systems 265 may comprise a cathode preparation unit 275 configured to embed primary cathode active material particles 120, which may be single grains or be at groups smaller than 10, in electrically conductive metallic porous structure 110 to yield cathode(s) 100B. In non-limiting examples, the cathode electrically conductive metallic porous structure may comprise aerogel/foam comprising any of aluminum, nickel and/or stainless-steel, their combinations and/or their alloys.

In certain embodiments, systems 265 may be configured to assemble mono-cell battery 270 from one anode 100A and one cathode 100B, separated by a semi-solid separator 134. Advantageously, for anode(s) 100A and cathode(s) 100B which have a spatially uniform resistance, electrodes 100 may be made to be thick, simplifying assembly and sparing space by not requiring folding and elaborate separators, while maintaining low resistance and good conductivity due to the structure and construction of electrodes 100, as disclosed herein. Moreover, mono-cell batteries 270 may have low resistance, uniform cell parameters and higher energy density. Current collection may be carried out by the respective electrically conductive metallic porous structures 110 of anode(s) 100A and cathode(s) 100B, respectively, further simplifying assembly, sparing additional space and maintaining the spatially uniform resistance of electrodes 100.

In certain embodiments, anode(s) and/or cathode(s) of disclosed mono-cell battery 270 may be binder-free and/or may be configured to have a specified form factor, such as especially broad, or having a specified shape which is unattainable by prior art batteries that are limited in their form factor by the larger number of components and more complex assembly process. In certain embodiments, anode(s) and/or cathode(s) of disclosed mono-cell battery 270 may be between 200 μm and 1 mm thick.

Figure 6A:
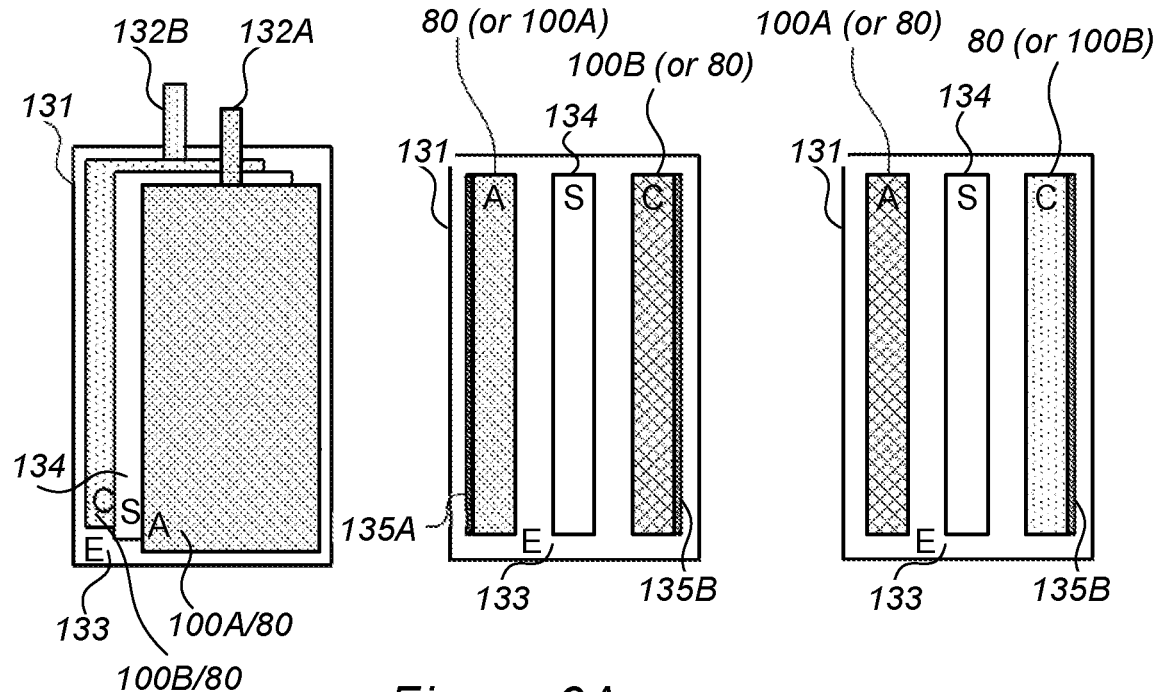
FIGS. 6A and 6B are high-level illustrations of batteries, according to some embodiments of the invention.
Figure 6B:
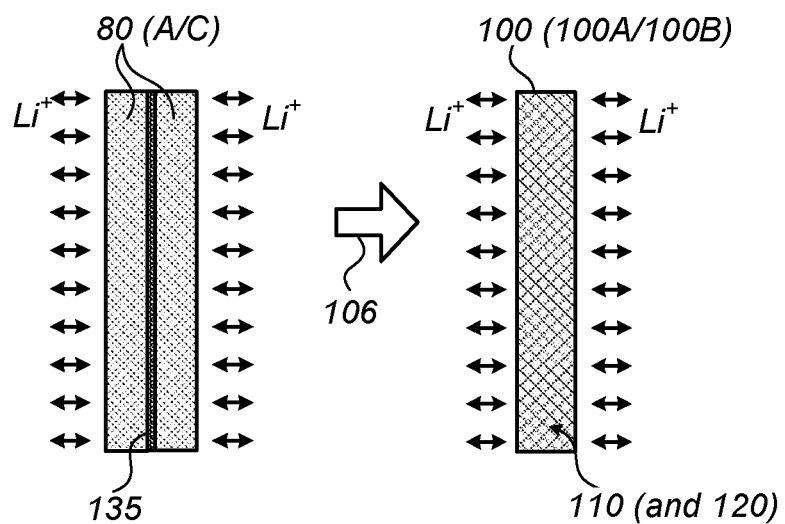

FIGS. 6A and 6B are high-level illustrations of batteries 130, according to some embodiments of the invention. In FIG. 6A, Battery 130 is illustrated in views that show anode "A" 100A/80 (with corresponding tab 132A), separator "S" 134 and cathode "C" 100B/80 (with corresponding tab 132B) in electrolyte "E" 133 within pouch 131 at face view and side views in a very schematic manner. It is noted that disclosed embodiments are applicable to various cell configurations such as soft pouch (package) cells, cylindrical cells, prismatic cells, etc. Clearly, multiple anodes, cathodes and/or separators may constitute the battery, the exact structure of which is not shown. As indicated, disclosed electrodes 100 may be integrated in the battery (or cell) in various configurations, e.g., as anode 100A, cathode 100B, with both anodes 100A and cathodes 100B used in the battery or with just one type of anode(s) 100A or cathode(s) 100B used with corresponding prior art cathode(s) or anode(s) 80, respectively or in combinations thereof in different cells of the battery. Electrodes 100, namely either or both anode(s) 100A and/or cathode(s) 100B may comprise current collectors 135A, 135B, respectively as do prior art electrodes 80, or anode(s) 100A and/or cathode(s) 100B may be used without corresponding current collectors, using portion(s) of aerogel and/or foam 110 as the respective current collector replacement—as indicated schematically in the right-hand illustration in FIG. 6A.

FIG. 6B illustrates schematically electrode 100 that may replace prior art electrodes 80, according to some embodiments of the invention. Prior art electrodes 80 typically comprise two electrodes 80 that are attached, back-to-back, to a current collector 135, e.g., current collectors 135A, 135B for prior art anodes and cathodes, respectively, denoted schematically as 80 (A/C). Lithium ions Li+ are indicated schematically as entering and exiting electrodes 80 on either side of current collector 135, with respect to complementary electrodes that are not shown. Disclosed electrodes 100 (anodes 100A and/or cathodes 100B) may replace (indicated by arrow 106) either or both prior art anodes and/or cathodes 80 (A/C), respectively, optionally disposing of prior art intermediate current collector 135 as metallic porous structure 110 functions to replace it.

Due to prior art electrode structure, the active material particles in prior art electrodes 80 experience different resistance values due to having varying levels of proximity to current collector 135, varying electron conductivity paths to current collector 135, varying ion conductivity paths to the electrolyte, and varying amounts and geometric organization of binders (and additives) surrounding the active material particles. The prior art different resistance values result in overall high prior art electrode resistance and non-uniform activity and degradation of the prior art active material particles. In contrast, and advantageously, active material particles in disclosed electrodes 100 experience much more uniform conditions and resistance values, because metallic porous structure 110 surrounds the particles and provides more uniform electron conductivity, the multitude of pores in porous structure 110 provide a high and more uniform degree of ion conductivity and less or no binder is present. Consequently, disclosed electrodes 100 have lower overall resistance than prior art electrodes 80 and active material particles 120 experience more uniform conditions and therefore degrade more uniformly—extending the overall cycling lifetime of electrodes 100. Moreover, disclosed electrodes 100 enable producing thinner cells than in the prior art, as current collectors 135 are not necessarily required and/or producing electrodes 100 with higher energy density, as the higher and more uniform electron and ion conductivity and the higher porosity enable increasing the density of active material particles 120 within electrodes 100. Certain embodiments comprise cells 130 configured as mono-cells, having one anode 100A and one cathode 100B separated by separator 134 and/or semi-solid electrolyte 133—simplifying the assembly processes (e.g., stacking, winding and/or folding) and further increasing the energy density, e.g., by estimated 1-15% (or intermediate values), depending of the type of battery and volume of separator used in the prior art, as no multiple current collectors 135 and fewer separators 134 are required. For example, in prior art high-energy cells, high load electrodes are used with thicker electrodes and less separator, occupying only ca. 1% of the cell thickness. In another example, in prior art high-power cells, thinner electrodes are used and the separator occupies a larger portion of the cell thickness since more electrodes are used, e.g., up to 15%. Disclosed cell configurations may be used to reduce most of the separator volume in either application. In various embodiments, cells 130 may be designed to have specified resistance and capacity values, by modifying the electrode thickness and the active material density, while keeping similar electrode structure and uniform resistance and degradation values.

FIGS. 7A and 7B are high-level schematic illustrations of mono-cell batteries 130, according to some embodiments of the invention, compared with prior art battery configurations illustrated schematically in FIGS. 7C and 7D.

Prior art batteries 60 comprise folded stacks 70 of multiple alternating sheets of anodes (with respective current collector) 80A, separators 134 and cathodes (with respective current collector) 80B—making battery assembly processes complex, requiring any of 1%, 5%, 10%, 15% or any intermediate value as additional cell volume for separators, and make the batteries sensitive to inconsistencies in layer thickness (due to production and/or operation) which may result in safety issues. Prior art assembly processes are complex, requiring intricate folding or rolling procedure to reach the fine lamellar structure of prior art batteries 60. Moreover, electrolyte filling is more complicated as good contact must be established between the electrolyte and all electrodes, possibly requiring additional operations such as vacuum and/or pressure application 65.

As shown above, disclosed electrode 100 configurations overcome the prior art varying resistance of different active material particles that depends on their location and distance from the current collectors, and yield electrodes 100 with spatially uniform resistance. Therefore, disclosed electrode configurations are less or not sensitive to electrode thickness, avoiding the dependency of electrode resistance on electrode thickness which is so prominent in the prior art. Moreover, disclosed electrodes and batteries may have more variable form factors than in the prior art due to the simpler assembly, smaller number of components and simpler spatial structure. For example, not only their thickness but also the lateral dimensions of the electrodes and batteries may be more freely adjusted to the application, e.g., be configured to have larger lateral dimensions (e.g., broader and flatter, or have specified shapes which are not attainable with prior art technology) for different applications such as consumer, EV, grid, etc. Especially using metallic porous structure 110 as the current collector provides highly effective and stable transportation of electrons.

Certain embodiments comprise using fewer and thicker layers of anode 100A and cathodes 100B, and consequently smaller volume of separator 134, simpler assembly process, and simpler preparation for operation. Certain embodiments, illustrated schematically in FIGS. 7A and 7B, even enable producing batteries 270 as mono-cells—with single anode 100A and single cathode 100B separated by separator 134, and produced in a much simpler assembly process (see e.g., FIG. 4). In various embodiments, anode 100A and cathode 100B may be much thicker than prior art anode 80A and cathode 80B, respectively, as electrode active material particles experience the same resistance irrespective of their location within the electrode, as explained above. For example, while prior art anodes are about 10-150 μm on each side of the anode current collector that is about 5-15 μm thick and prior art cathodes are about 20-300 μm on each side of the cathode current collector that is about 5-15 μm thick, and prior art separator thickness is about 6-15 μm, disclosed cells may comprise single anodes having a thickness of 50 μm to 5 mm and single cathodes having a thickness of 50 μm to 5 mm, with a single intermediate separator (rather than prior art multiple, folded separator sheets). In certain embodiments, anodes 100A and cathodes 100B may be configured with respective active material particles 120 embedded in metallic porous structure 110, and possibly treated with dry etching 320.

Certain embodiments comprise mono-cell batteries 270 comprising at least one (or single) anode 100A and at least one (or single) cathode 100B separated by at least one (or single) separator 134 or by semi-solid electrolyte 133, wherein anode 100A and cathode 100B comprise corresponding anode and cathode active material particles 120 embedded in respective electrically conductive metallic porous structures 110, e.g., foams illustrated schematically in FIG. 7A, aerogels illustrated schematically in FIG. 7B, or combinations thereof, e.g., different anode 100A and cathode 100B. In embodiments, a mono-cell battery has a single anode and a single cathode. For example, anode active material particles 120 may comprise particles of metalloids comprising Si, Ge and/or Sn, metals comprising Mn and/or Fe particles, and/or carbon-based material comprising graphite and/or graphene, and anode electrically conductive metallic porous structure 110 may comprise aerogel and/or foam that comprise any of copper, nickel and/or titanium, their combinations and/or their alloys. For example, cathode active material particles 120 may comprise primary cathode material nanoparticles which are single grains or are at groups smaller than 10, and cathode electrically conductive metallic porous structure 110 may comprise aerogel and/or foam made of any of aluminum, nickel and/or stainless-steel their combinations and/or their alloys. In certain embodiments, anode(s) 100A and/or cathode(s) 100B may be prepared by dry etching 320 to remove at least part of an oxidized surface of the respective active material particles, thereby simplifying the production process and further utilizing the porous structure of electrically conductive metallic porous structures 110 such as aerogels or foams. Mono-cell batteries 270 may be configured as any of Li-ion, Na-ion and/or Li—S battery or supercapacitors.

FIG. 8 is a high-level flowchart illustrating methods 300, according to some embodiments of the invention. The method stages may be carried out with respect to system 200 described above, which may optionally be configured to implement method 300. Method 300 may comprise the following stages, irrespective of their order.

Method 300 comprises preparing an anode for a lithium ion battery, by preparing a raw anode (stage 310) from oxidized active material particles and a porous supporting structure that includes electron conductive elements and pores that interconnect the oxidized active material particles among themselves and to a surface of the raw anode, and applying a dry etching treatment (e.g., different types of RIE such as ICP, DRIE, PE, TCP, ECR, as well as various plasma etchers and ion enhanced etchers) (stage 320) to the raw anode to at least partly reduce the oxidized active material particles through the pores to yield the anode in an operable state. The pores may be configured as ion conductive paths that interconnect the active material particles among themselves and/or with a surface of the anode.

In certain embodiments, method 300 may further comprise increasing amounts of binder(s) and/or conductive additive(s) during the preparation of the raw anode, to compensate for removal thereof during the dry etching treatment (stage 312).

In certain embodiments, method 300 may comprise embedding the oxidized active material particles in an electrically conductive metallic porous structure as the porous supporting structure (see stage 360 below). In certain embodiments, method 300 may comprise reducing the amounts or altogether eliminating binder(s) and/or additive (s), and possibly the current collector as well, e.g., when using the electrically conductive metallic porous structure as the porous supporting structure (stage 340).

In certain embodiments, method 300 may comprise carrying out preparing 310 in an aqueous (water-based) environment, such as in a water-based slurry, or in any other potentially oxidizing environment, such as air (stage 345).

In certain embodiments, method 300 may further comprise any of stabilizing the anode mechanically after the dry etching treatment (stage 330), passivating the anode chemically after the dry etching treatment (stage 332), and/or applying a post-treatment at least to the surface of the anode (stage 334), to stabilize the anode structure and/or to enhance electron and/or ion conductivity thereof.

Advantageously, disclosed systems 100 and methods 300 overcome a central difficulty in the preparation of anodes (e.g., for lithium ion batteries, e.g., metalloid-based anodes for fast charging lithium ion batteries), namely the need to keep the active material active throughout the anode preparation process which requires careful preparation procedures to avoid active material oxidation, preparing the anode under inert atmosphere etc. Prior art solvent-based preparation processes are also problematic with respect to the reactivity of the active material particles, as these may react with the respective solvents (e.g., water) or by modified inside the solvent (e.g., by agglomeration). Such cases make it hard or even impossible to manage the electrode preparation process and may result in performance and safety decreases. Moreover, anode preparation processes are typically water-based and are therefore inherently inclined to oxidize the active material if it is not fully isolated from the water used in the preparation process. In contrast, disclosed systems 200 and methods 300 enable simple handling and preparation of raw anode 230 from oxidized active material particles 232, while providing the required electronic and ionic conductivity by reducing (de-oxidizing) surface areas 242 of oxidized active material particles 232 which contact porous structure 234 in the anode structure. Advantageously, oxidized active material particles are much more stable and have lower surface energies than non-oxidized particles used in the prior art, allowing better and safer management of the electrode preparation process. Moreover, disclosed dry etching treatment 320 (e.g., different types of RIE, plasma etchers, ion enhanced etchers) is sufficient to activate raw anode 230 and yield prepared anode 240 because de-oxidized (reduced) surface areas 242 are the regions required to be ion-conductive as they contact porous structure 234 which are also the paths through which plasma treatment 320 is applied.

FIG. 8 further illustrates schematically methods 350, according to some embodiments of the invention. The method stages may be carried out to form electrode(s) 100 described above. Method 350 may comprise the following stages, irrespective of their order, which may be combined with other stages of methods 300.

Method 350 may comprise embedding active material particles in an electrically conductive metallic porous structure to yield an electrode (stage 360). For example, the distribution of the embedded active material particles in the metallic porous structure may be uniform.

In certain embodiments, embedding 360 may comprise mixing a slurry of the active material particles with an aerogel in sol and/or gel form and drying the sol and/or gel form to yield the metallic porous structure with the embedded active material particles (stage 370). For example, the mixing may be configured to yield a uniform mixture, and upon drying, a uniform distribution of the embedded active material particles in the aerogel.

In certain embodiments, embedding 360 may comprise mixing a slurry of the active material particles with a foam and drying the foam to yield the metallic porous structure with the embedded active material particles (stage 380). For example, the mixing may be configured to yield a uniform mixture, and upon drying, a uniform distribution of the embedded active material particles in the dried foam.

In certain embodiments, embedding 360 may comprise introducing the active material particles directly into the prepared metallic porous structure (stage 390) and binding the active material particles to the metallic porous structure, to yield the metallic porous structure with the embedded active material particles (stage 395). For example, the introduction of the active material particles may be carried out in a way that yields a uniform mixture.

FIG. 8 further illustrates schematically methods 400, according to some embodiments of the invention. The method stages may be carried out to form electrode(s) 100 (or 240) described above. Method 400 may comprise the following stages, irrespective of their order, which may be combined with other stages of methods 300 and 350.

Certain embodiments of method 400 comprise implementing stages of method 300 such as dry etch treatment 320 on raw anodes prepared according to stages of method 350, e.g., with aerogel and/or foam as metallic porous structure (stage 410). Certain embodiments utilize the highly porous structure of aerogel or foam metallic porous structure to reduce most or all of the surface of the oxidized active material particles (stage 412), yield high ionic and electric conductivity, and moreover produce electrodes (anode and/or cathodes) with spatially uniform resistance (stage 414), as conductivity is not determined by a distance to a current collector, which in certain embodiments may be replaced by metallic porous structure itself (stage 416).

In certain embodiments, method 300 may comprise preparing mono-cell batteries from disclosed electrodes (stage 420).

FIG. 8 further illustrates schematically battery preparation methods 420, according to some embodiments of the invention. The method stages may be carried out to form mono-cell batteries 270 described above. Method 420 may comprise the following stages, irrespective of their order, which may be combined with other stages of methods 300, 350 and 400.

In certain embodiments, method 420 comprises preparing the batteries by preparing at least one anode and at least one cathode which have a spatially uniform resistance (stage 430) and combining the at least one anode and the at least one cathode into a mono-cell battery configuration (stage 440). For example, preparation 430 may be carried out by embedding anode and cathode active material particles in respective electrically conductive metallic porous structures to yield the respective at least one anode and at least one cathode (stage 450).

In certain embodiments, the anode active material particles may comprise particles of at least one of: metalloids comprising Si, Ge and/or Sn, metals comprising Mn and/or Fe particles, and/or carbon-based material comprising graphite and/or graphene and the anode electrically conductive metallic porous structure comprises aerogel and/or foam that comprise copper, nickel and/or titanium, their combinations and/or their alloys. In certain embodiments, the cathode active material particles may comprise primary cathode material nanoparticles which are single grains or are at groups smaller than 10, and wherein the cathode electrically conductive metallic porous structure comprises aerogel and/or foam made of aluminum, nickel and/or stainless-steel their combinations and/or their alloys.

In certain embodiments, method 420 may further comprise preparing at least one raw anode from oxidized anode active material particles and a porous supporting structure that includes electron conductive elements and pores that interconnect the oxidized active material particles among themselves and to a surface of the at least one raw anode (stage 460), and applying a dry etching treatment to the at least one raw anode to at least partly reduce the oxidized anode active material particles through the pores and yield the at least one anode in an operable state (stage 470).

Method 420 may further comprise configuring a mono-cell battery from one anode and one cathode separated by a separator or by a semi-solid electrolyte (stage 480), wherein the anode and the cathode comprise the electrode, prepared with corresponding anode and cathode active material particles.

Disclosed lithium ion batteries may be configured, e.g., by selection of materials, to enable operation at high charging and/or discharging rates (C-rate), ranging from 3-10 C-rate, 10-100 C-rate or even above 100 C, e.g., 5 C, 10 C, 15 C, 30 C or more. It is noted that the term C-rate is a measure of charging and/or discharging of cell/battery capacity, e.g., with 1 C denoting charging and/or discharging the cell in an hour, and XC (e.g., 5 C, 10 C, 50 C etc.) denoting charging and/or discharging the cell in 1/X of an hour—with respect to a given capacity of the cell.

Fast charging cells may comprise rechargeable Li-ion cells having anode material based on metalloids such as Si, Ge and/or Sn, as taught e.g., by any of U.S. Pat. Nos. 9,472,804 and 10,096,859, and U.S. patent application Ser. Nos. 15/480,888, 15/414,655 and 15/844,689, which are incorporated herein by reference in their entirety. Disclosed embodiments may be applied to metalloid (Si, Ge and/or Sn)-based anodes for fast charging lithium ion cells.

The active material particles may comprise metalloids such as Si, Ge and/or Sn particles, metals such as Mn and/or Fe and/or carbon-based material such as graphite and/or graphene, and/or combinations thereof as anode material, and the metallic porous structure may comprise aerogel/foam made of any of aluminum, nickel, copper, gold, titanium, stainless steel, their combinations and/or their alloys; and/or the active material particles may comprise any of NCA-based, NMC-based, LFP-based, LNM-based and/or LMO-based particles as cathode material and the metallic porous structure may comprise aerogel/foam that comprise aluminum, nickel and/or stainless-steel their combinations and/or their alloys. In any of these cathode materials, primary particles rather than secondary particles may be used in disclosed cathodes.

It is noted that in batteries 130, separator(s) 134 may comprise various materials, e.g., polymers such as any of polyethylene (PE), polypropylene (PP), polyethylene terephthalate (PET), poly vinylidene fluoride (PVDF), polymer membranes such as a polyolefin, polypropylene, or polyethylene membranes. Multi-membranes made of these materials, micro-porous films thereof, woven or non-woven fabrics etc. may be used as separator(s), as well as possibly composite materials including, e.g., alumina, zirconia, titania, magnesia, silica and calcium carbonate along with various polymer components as listed above.

Electrolytes 133 may comprise linear and cyclic carbonate solvents such as dimethyl carbonate (DMC), diethyl carbonate (DEC), ethyl methyl carbonate (EMC) or esters such as ethyl acetate (EA), propionates and butyrates; and ethylene carbonate (EC), fluoroethylene carbonate (FEC) or vinylene carbonate (VC), respectively. For example, electrolytes may comprise a large proportion, e.g., 10%, 20%, 30% or more of VC and/or FEC as prominent cyclic carbonate compound, as disclosed e.g., in U.S. patent application Ser. No. 15/844,689, incorporated herein by reference in its entirety.

Electrolytes 133 may comprise solid electrolytes such as polymeric electrolytes such as polyethylene oxide, fluorine-containing polymers and copolymers (e.g., polytetrafluoroethylene), and combinations thereof.

Electrolytes 133 further comprise lithium electrolyte salt (s) such as $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$), tris(trimethylsilyl)phosphite (TMSP), and combinations thereof.

Electrolytes 133 may comprise solid or semi-solid electrolytes, such as polymeric electrolytes, e.g., polyethylene oxide, fluorine-containing polymers and copolymers (e.g., polytetrafluoroethylene), flexible polymeric and/or gel electrolytes, and/or combinations thereof, e.g., as taught e.g., by WIPO Application No. PCT/IL2017/051358, incorporated herein by reference in its entirety.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A mono-cell battery comprising:
    a single anode comprising anode active material particles embedded in an electrically conductive metallic porous structure,
    a single cathode comprising primary cathode active material nanoparticles that are embedded in an electrically conductive metallic aerogel made of aluminum, nickel and/or stainless-steel their combinations and/or their alloys, wherein the primary cathode material nanoparticles are single grains or are in groups smaller than 10 grains that are distributed uniformly within the aerogel, and
    a single intermediate separator or a semi-solid electrolyte, configured to separate the single anode from the single cathode,
    wherein each of the single anode and the single cathode has a spatially uniform resistance; and wherein the anode electrically conductive metallic porous structure comprises aerogel and/or foam that comprises any of copper, nickel and/or titanium, their combinations and/or their alloys.

2. The mono-cell battery of claim 1, wherein the anode active material particles comprise particles of at least one of: Si, Ge, Sn, and Sb, and alloys thereof, and/or carbon-based material comprising graphite and/or graphene.

3. The mono-cell battery of claim 1,
wherein the anode active material particles comprise particles of at least one of: Si, Ge, Sn, Sb and alloys thereof, and/or carbon-based material comprising graphite and/or graphene; and
wherein the electrically conductive metallic porous structure of the anode comprises aerogel and/or foam that comprises any of copper, nickel, titanium, combinations thereof and/or alloys thereof.

4. The mono-cell battery of claim 1, wherein a surface of the respective active material particles of the single anode and/or the single cathode is at least partly dry-etched and at least partly de-oxidized.

5. The mono-cell battery of claim 1, wherein the single anode and/or the single cathode is binder-free.

6. The mono-cell battery of claim 1, wherein the single anode and/or the single cathode are between 50 μm and 5 mm thick.

7. The mono-cell battery of claim 1, further configured to have a thickness between 400 μm and 2 mm.

8. The mono-cell battery of claim 1, configured as any of Li-ion, Na-ion and/or Li—S battery or supercapacitor.

9. The mono-cell battery of claim 1, wherein the primary cathode active material nanoparticles comprise at least one of NCA-based formulations and NMC-based formulations.

10. The mono-cell battery of claim 1, having at least at 5 C charging rate.

* * * * *